(12) United States Patent
Iskander (10) Patent No.: US 9,355,484 B2
(45) Date of Patent: May 31, 2016

(54) SYSTEM AND METHOD OF TILE MANAGEMENT

(71) Applicant: APPLE INC., Cupertino, CA (US)

(72) Inventor: Alexis Allison Iskander, San Jose, CA (US)

(73) Assignee: APPLE INC., Cupertino, CA (US)

( * ) Notice: Subject to any disclaimer, the term of this patent is extended or adjusted under 35 U.S.C. 154(b) by 158 days.

(21) Appl. No.: 14/215,594

(22) Filed: Mar. 17, 2014

(65) Prior Publication Data

US 2015/0262398 A1    Sep. 17, 2015

(51) Int. Cl.
| | |
|---|---|
| *G06T 11/40* | (2006.01) |
| *G06F 3/041* | (2006.01) |
| *G06F 3/0488* | (2013.01) |
| *G09G 5/14* | (2006.01) |
| *G06T 15/00* | (2011.01) |

(52) U.S. Cl.
CPC .............. *G06T 11/40* (2013.01); *G06F 3/041* (2013.01); *G06F 3/0488* (2013.01); *G06T 15/005* (2013.01); *G09G 5/14* (2013.01); *G06F 2203/04101* (2013.01); *G06F 2203/04808* (2013.01); *G06T 2200/24* (2013.01); *G06T 2210/12* (2013.01)

(58) Field of Classification Search
USPC ................................................. 345/419, 420
See application file for complete search history.

(56) References Cited

U.S. PATENT DOCUMENTS

| | | | | |
|---|---|---|---|---|
| 7,023,444 | B2 * | 4/2006 | Emberling | G06T 15/04 345/552 |
| 7,415,356 | B1 * | 8/2008 | Gowda | G01C 11/00 342/357.31 |
| 8,004,522 | B1 | 8/2011 | Toksvig et al. | |
| 8,245,011 | B2 * | 8/2012 | Favergeon-Borgialli | G06F 12/0207 345/543 |
| 8,711,181 | B1 * | 4/2014 | Nourse | G06F 3/14 345/660 |
| 8,738,595 | B2 * | 5/2014 | Pfeifle | G06F 17/30241 707/706 |
| 9,063,951 | B1 * | 6/2015 | Zhu | G06F 17/30902 |
| 9,111,397 | B2 * | 8/2015 | Kalai | G06T 1/60 |
| 2007/0182738 | A1 * | 8/2007 | Feldman | G06T 15/20 345/427 |

(Continued)

FOREIGN PATENT DOCUMENTS

WO    2013101167 A1    7/2013

*Primary Examiner* — Kimbinh T Nguyen
(74) *Attorney, Agent, or Firm* — Kilpatrick Townsend & Stockton LLP (57) ABSTRACT

A device selectively loads map tiles into its memory while re-using others. As a user chooses different sections of a master map to be displayed, the device determines an intersection between the formerly and currently viewed sections. The device copies selected references to map tiles in the intersection, with some re-indexing, from an array for the formerly displayed section into an array for the newly displayed section. The view of the map might be a three-dimensional perspective view of a two-dimensional surface. The device can create bounding boxes around polygonal perimeters of the viewed areas. The bounding boxes are divided into rectangles corresponding to the tiles located on the master map. The device determines which rectangles within the bounding boxes both (a) contain portions of their respective polygons and (b) overlap each other respective to their locations on the master map. The device already stores map tiles for those rectangles.

21 Claims, 8 Drawing Sheets

(56) References Cited

U.S. PATENT DOCUMENTS

| | | |
|---|---|---|
| 2008/0079719 A1 | 4/2008 | Woo |
| 2010/0085350 A1 | 4/2010 | Mishra et al. |
| 2011/0050640 A1* | 3/2011 | Lundback ............... G06F 3/041 345/175 |
| 2012/0274633 A1 | 11/2012 | Ivanov et al. |
| 2013/0093750 A1 | 4/2013 | Cornell et al. |
| 2013/0202197 A1 | 8/2013 | Reeler et al. |
| 2013/0300740 A1 | 11/2013 | Snyder et al. |
| 2013/0321411 A1 | 12/2013 | Pahwa et al. |
| 2013/0325481 A1 | 12/2013 | van Os et al. |
| 2013/0342537 A1 | 12/2013 | Vorhies |
| 2015/0186443 A1* | 7/2015 | Ito .................... G06F 17/30356 707/618 |

\* cited by examiner

SYSTEM AND METHOD OF TILE MANAGEMENT

BACKGROUND OF THE INVENTION

Embodiments of the invention pertain to the field of computer graphics generally, and more specifically to the loading of graphical tiles into volatile memory. Users of mobile devices such as smart phones often use their mobile devices to perform navigation functions. Mobile devices are often equipped with global position systems (GPS) that can inform the mobile devices as to their current whereabouts. Some popular navigation applications executable on mobile devices include map applications that can display, to the user, geographical information about the mobile device's current surroundings. For example, a navigation application might use a mobile device's GPS to determine its current coordinates, and then present, to a user, a map of an area of specified dimensions centered around the mobile device's location. Such a map might include markings such as streets and labeled points of interest.

Such a navigation application might be capable of presenting maps of areas found in various places all over the globe. Map data for the entire globe might be divided into rectangular tiles. Each tile may contain map data for a different portion of the globe. The globe is a large environment, though, and mobile devices often have limited memory and limited storage capabilities. It might not be feasible for a state-of-the-art mobile device to store, within its memory, all at once, all of the tiles for the entire globe. Indeed, even if a mobile device were equipped with sufficient memory to store all of the globe's map tiles concurrently, it might not be desirable for the mobile device to occupy its limited memory resources overwhelmingly with map tiles. At any given moment, the mobile device's user typically is interested in viewing just one selected section of the map, which may include just a small fraction of all of the map's tiles. Additionally, a mobile device's user often will want to store and execute multiple different applications, so such applications usually need to share the mobile device's limited memory and storage resources. It is unlikely that a mobile device's user will want his mobile device's memory to be dominated by map tiles to the exclusion of other information that could be stored in that memory.

BRIEF SUMMARY OF THE INVENTION

Disclosed herein are techniques for selectively loading map tiles into a mobile device's memory (e.g., volatile memory) from a source external to the mobile device. For example, according to one embodiment, a mobile device can determine a selected set of map tiles that the mobile device should load into its memory from a server remote to the mobile device. Such a remote server can store map tiles for the entire globe, and can serve, over one or more networks, specified map tiles to mobile devices that request those specified map tiles. The set of map tiles that the mobile device needs to display to its user may change as the user instructs the mobile device to present different sections of the map. Therefore, as the mobile device's user selects different sections of the map to view, the mobile device can select different map tiles to load into its memory from the remote server.

The mobile device can select the map tiles to load from the remote server based at least in part on a current map section that the mobile device's user wants to view. Additionally, some of the map tiles previously loaded into the mobile device's memory from the remote server might be reusable even after the mobile device's user selects a different section of the map to view. Often, the mobile device's user will select such a different map section using scrolling gestures relative to the mobile device's touchscreen. Consequently, the map section that the mobile device needs to render often will be relatively close to the previous map section that the mobile device has already rendered and displayed. For example, if a current map section at least partially overlaps another map section that the mobile device had previously rendered and displayed, then it is possible that the mobile device will be able to re-use the map tiles that are contained within the intersecting region of the areas of the two map sections. Under such circumstances, the mobile device can conserve time, network bandwidth, and processing resources by requesting, from the remote server, the map tiles that are found in the current area but not in the previous area, without requesting any of the map tiles that are already contained in the mobile device's memory.

According to one embodiment of the invention, a mobile device can display a selected area of a global map in three-dimensional perspective. In such an embodiment, rather than showing the map tiles for the current area from a strictly overhead view, the mobile device can render those map tiles from a specified angle, or from a specified point in space. Map tiles rendered from a perspective that is not directly above those map tiles can appear, on the mobile device's display, to be tilted. The perimeters of those displayed map tiles can take the shapes of trapezoids or rhombuses rather than rectangles. Disclosed herein are special techniques whereby a mobile device can select map tiles to load into its memory from a remote server under circumstances in which the mobile device displays map tiles from a perspective such that a ray emanating from the view point is not perpendicular to the displayed map tiles' surfaces.

Although embodiments of the invention discussed herein are often described in the context of a map, alternative embodiments of the invention can involve graphics or images other than maps. Virtually any image that can be divided into sections, with each section viewable on a mobile device display at a different time, can be the subject of the techniques and systems disclosed herein.

DETAILED DESCRIPTION OF THE INVENTION

A device selectively loads map tiles into its memory while re-using others. As a user chooses different sections of a master map to be displayed, the device determines an intersection between the formerly and currently viewed sections. The device copies selected references to map tiles in the intersection, with some re-indexing, from an array for the formerly displayed section into an array for the newly displayed section. The view of the map might be a three-dimensional perspective view of a two-dimensional surface. The device can create bounding boxes around polygonal perimeters of the viewed areas. The bounding boxes are divided into rectangles corresponding to the tiles located on the master map. The device determines which rectangles within the bounding boxes both (a) contain portions of their respective polygons and (b) overlap each other respective to their locations on the master map. The device already stores map tiles for those rectangles.

Figure 1:
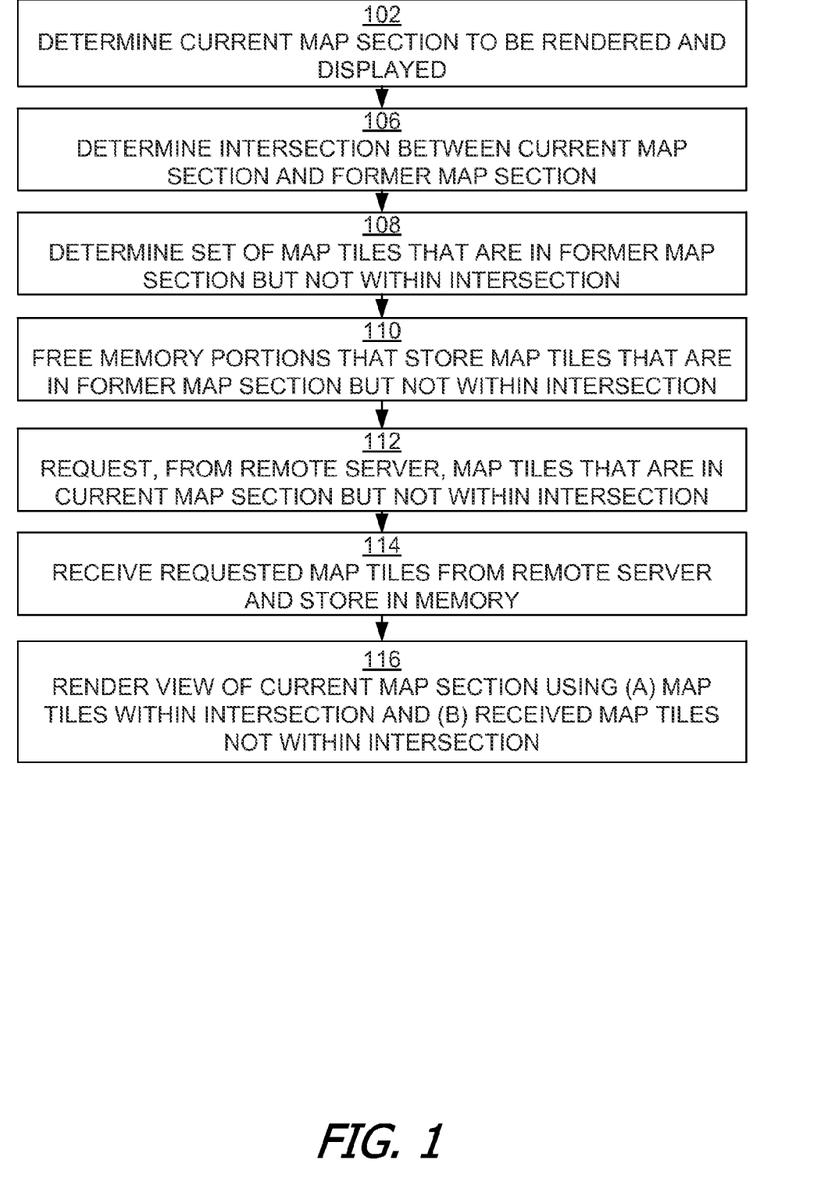
FIG. 1 is a flow diagram that illustrates an example of a technique for selectively loading map tiles from a remote server into a mobile device's memory, according to an embodiment of the invention.

FIG. 1 is a flow diagram that illustrates an example of a technique for selectively loading map tiles from a remote server into a mobile device's memory, according to an embodiment of the invention. In block 102, a mobile device determines a current map section to be rendered and displayed. The map section can have specified dimensions, such as seven map tiles by seven map tiles, for a total of 49 map tiles in the map section. The current map section has a location relative to a master map; the current map section is just one part of the master map, and is made up of map tiles from that part of the master map. A former map section that the mobile device previously rendered and displayed also has a location relative to the master map, and is made up of map tiles from another part of the master map. These current and former sections of the master map can at least partially intersect.

In block 106, the mobile device determines an intersection between the current map section and the former map section. In block 108, the mobile device determines a set of map tiles that are in the former map section but not within the intersection. In block 110, the mobile device frees portions of its memory that currently store map tiles that are in the former map section but not within the intersection. The mobile device maintains, in its memory, map tiles that are within the intersection. In block 112, the mobile device requests, from a remote server, map tiles that are in the current map section but not within the intersection. The mobile device does not request, from the remote server, any map tiles that are within the intersection, as such map tiles are already contained in the mobile device's memory. In block 114, the mobile device receives the requested map tiles from the remote server and stores the received map tiles in its memory. In block 116, the mobile device renders a view of the current map section using (a) the map tiles that are within the intersection and (b) the received map tiles that are in current map section but not within the intersection. In block 118, the mobile device displays the rendered view of the map section.

I. MASTER MAP TILES

Figure 2:
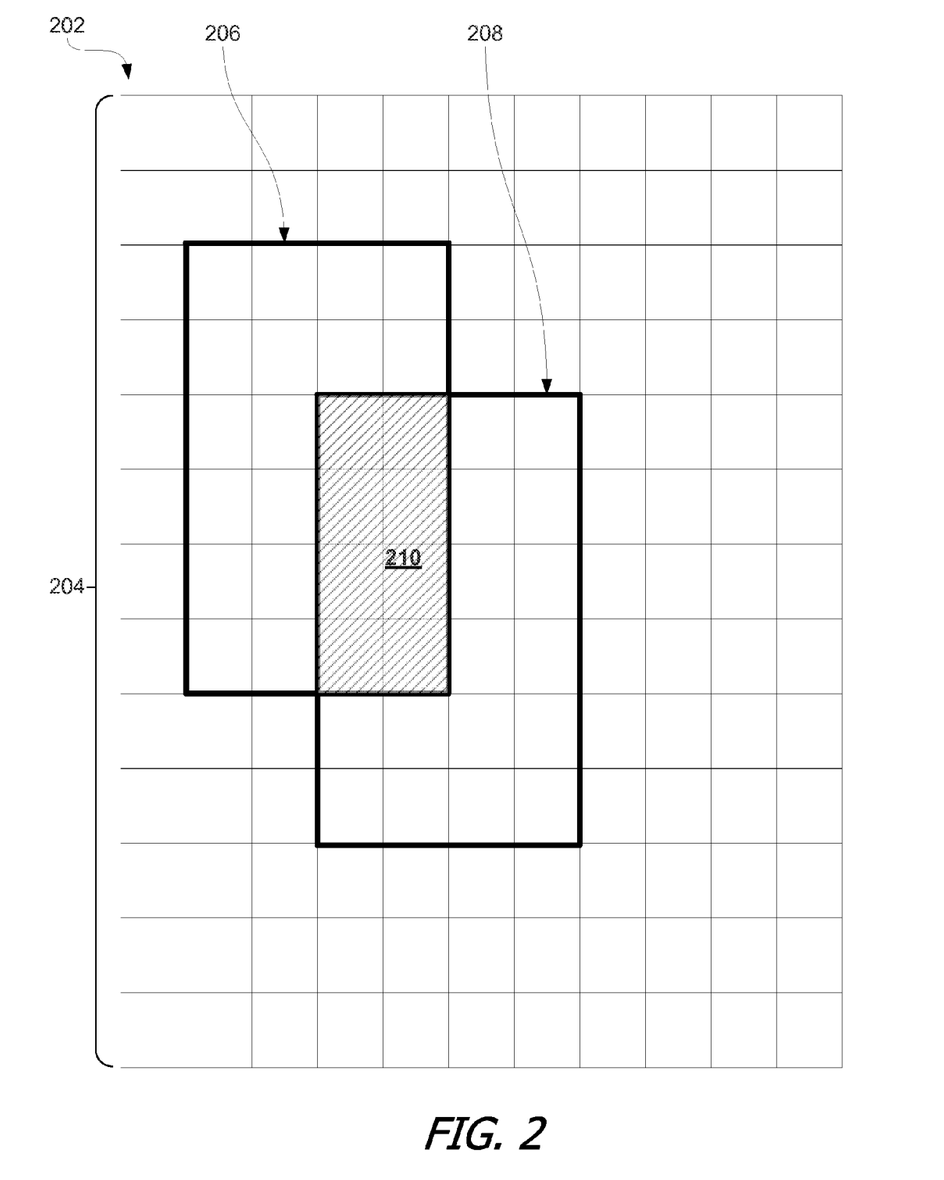
FIG. 2 is a diagram that illustrates an example of a master map that is divided into constituent map tiles and on which intersecting current and former areas are located, according to an embodiment of the invention.

FIG. 2 is a diagram that illustrates an example of a master map that is divided into constituent map tiles and on which intersecting current and former map sections are located, according to an embodiment of the invention. As is discussed above, a server remote from the mobile device can store all of the map tiles for the master map, which in one embodiment represents the entire globe. Master map 202 is formed of map tiles 204. Located on master map 202 are two map sections 206 and 208 having the same dimensions in map tiles. Current map section 206 represents an area of master map 202 that the mobile device's user currently wants to view. Former map section 208 represents an area of master map 202 that the mobile device previously rendered and displayed. As can be seen, current map section 206 intersects with former map section 208. The intersection 210 contains map tiles that are concurrently within both current map section 206 and former map section 208, but excludes map tiles that are only in one or the other map section.

In one embodiment of the invention, each map tile on master map 202 has a unique identifier. For example, each unique identifier can be a different integer. Map tiles on master map 202 can be consecutively numbered starting with the top left map tile on master map 202 and proceeding from map tile to map tile, first in a left-to-right direction and then in a top-to-bottom direction, such that each row of map tiles is associated with greater numbers than the rows above it. Because map tiles on master map 202 have unique identifiers, the map tiles found within intersection 210 will have the same unique identifiers regardless of whether those map tiles are considered in conjunction with the other map tiles in current map section 206 or in conjunction with the other map tiles in former map section 208.

In one embodiment of the invention, the mobile device requests specified map tiles from the remote server over one or more networks (e.g., the Internet). As is discussed above, in one embodiment, the mobile device requests, from the mobile server, map tiles that are within current map section 206 but not within intersection 210. The mobile device already stores, in its memory, map tiles that fall within intersection 210, because the mobile device previously requested and received those map tiles from the remote server. Also as is discussed above, in one embodiment, the mobile device frees portions of its memory that contain map tiles that are within former map section 208 but not within intersection 210. The mobile device can then allocate that freed memory for other purposes—potentially to store different map tiles. However, in freeing those portions of its memory, the mobile device does not free any portions that store map tiles that fall within intersection 210, as the mobile device can re-use such map tiles when rendering current map section 206.

II. THREE-DIMENSIONAL PERSPECTIVE VIEWS

Although a mobile device can present an "overhead" view of current map section 206, such that a ray extending from the view point from which current map section 206 is rendered toward the map surface is perpendicular to that surface, a mobile device also can present views of current map section 206 that are from various other view points and at various other angles. In one embodiment, by making different gestures relative to the mobile device's touchscreen, a user can cause the mobile device to tilt and/or rotate the view of current map section 206. When the mobile device renders current map section 206 from various different angles, the perimeter of the rendered view of map section 206 can be in the shape of a trapezoid or a rhombus rather than a rectangle, as would be the case from an "overhead" view. The perimeters of each of the map tiles within current map section 206 also can be non-rectangular in shape. Disclosed herein are special techniques for re-using map tiles under circumstances in which the view of current map section 206 (and potentially the view of former map section 208) is not the "overhead" view due to some tilting or rotation of the map surface.

Figure 3:
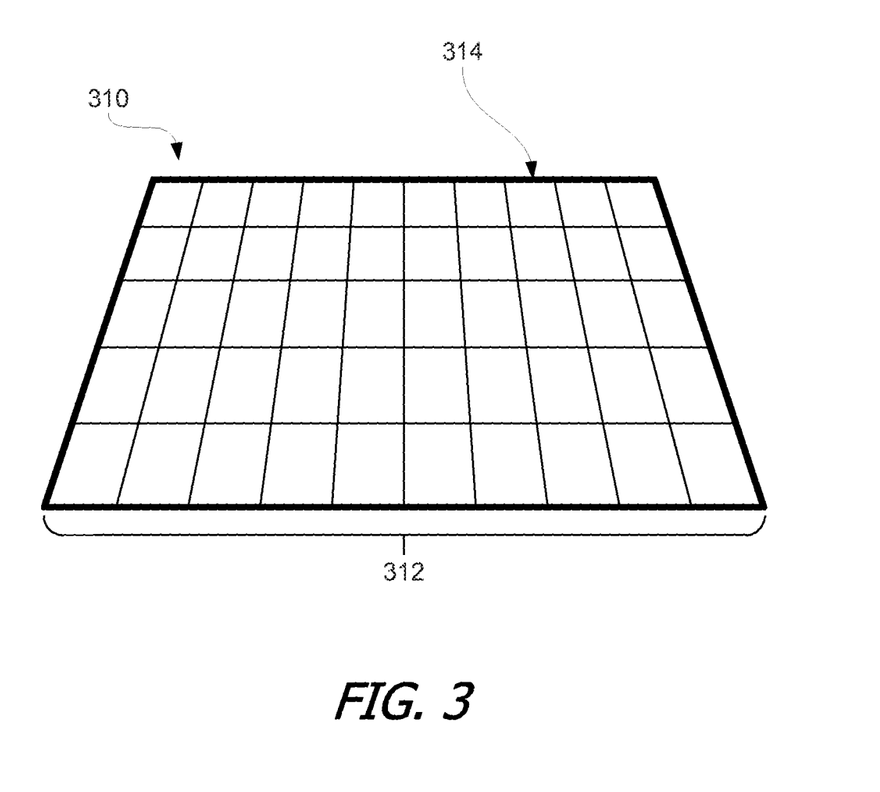
FIG. 3 is a diagram that illustrates an example of a multi-tile map section view possessing a trapezoidal perimeter due to that map section being viewed from a non-overheard perspective, according to an embodiment of the invention.

FIG. 3 is a diagram that illustrates an example of a multi-tile map section view possessing a trapezoidal perimeter due to that map section being viewed from a non-overheard perspective, according to an embodiment of the invention. Map section view 310 includes map tiles 312. Perimeter 314 of map section view 310 is trapezoidal in shape, such that the bottom edge of map section view 310 is longer than the top edge of map section view 310, due to the effect of perspective upon map section view 310. If undistorted by perspective, each of map tiles 312 would be rectangular in shape. Each of map tiles 312 has a unique identifier.

III. LOCATING PERSPECTIVE VIEWS ON MASTER MAP USING BOUNDING BOXES

Figure 4:
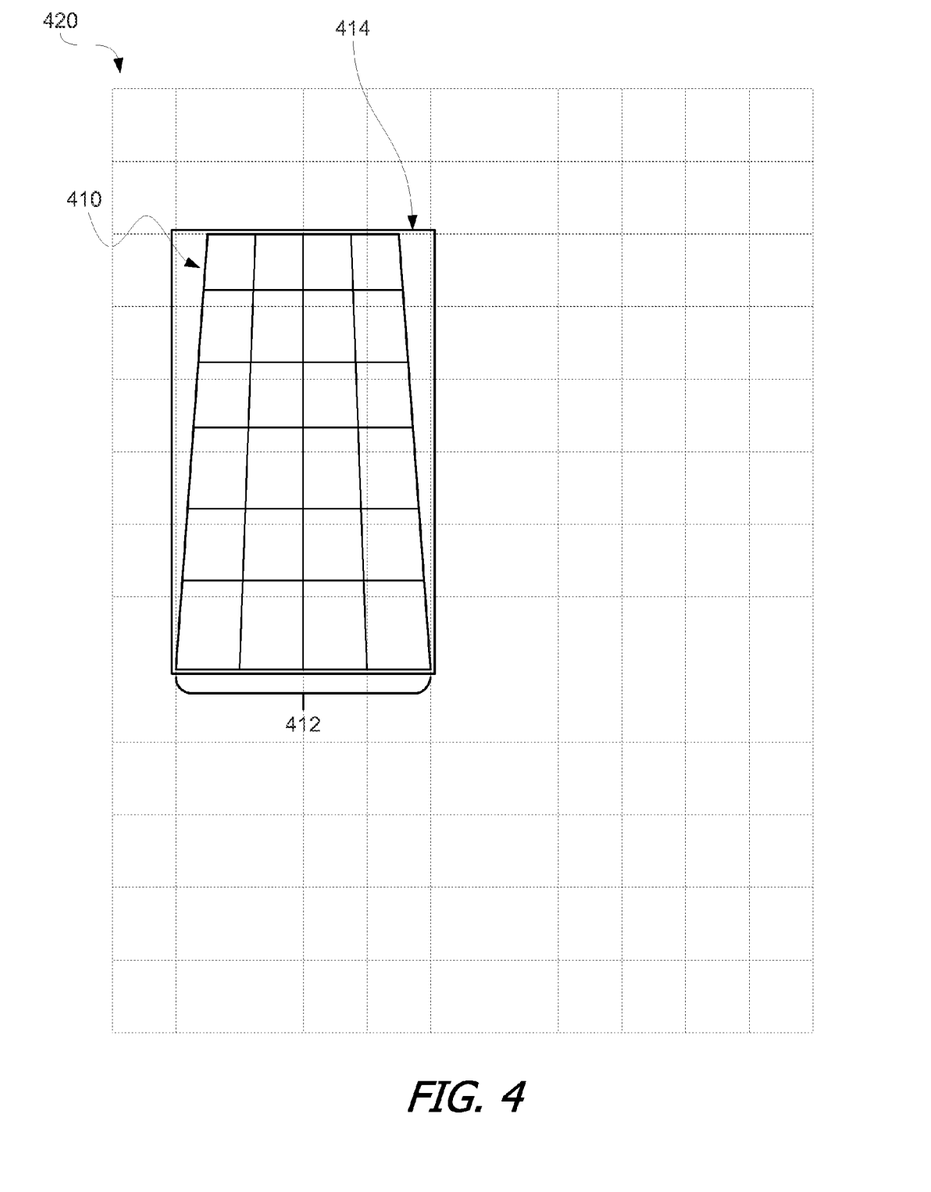
FIG. 4 is a diagram that illustrates an example of a perspective map section view located at a corresponding position relative to a master map, according to an embodiment of the invention.

Using techniques discussed herein, a mobile device can use perspective views of current and formerly displayed map sections in order to determine which map tiles can be re-used. One such technique involves the location of each such perspective view at its corresponding location relative to the master map prior to determining intersection. This technique involves the placement of a bounding box tightly about the perspective view's perimeter. FIG. 4 is a diagram that illustrates an example of a perspective map section view located at a corresponding position relative to a master map, according to an embodiment of the invention. Map section view 410 includes map tiles 412. The polygonal perimeter of map section view 410 represents boundaries of a projection, onto a view port, of a map section as viewed from a first point in three-dimensional space. A bounding box 414 surrounds map section view 410 as closely as possible without intersecting map section view 410.

According to an embodiment, a mobile device locates bounding box 414 relative to a master map 420. In one embodiment, the mobile device locates the upper left corner of bounding box 414 at a particular map tile, on master map 420, that has the same unique identifier as that possessed by the upper-most, left-most map tile in map section view 410. In one embodiment, the tiles of master map 420 are overlaid by bounding box 414 such that some of the overlaid tiles can contain at least portions of map section view 410.

This technique gives bounding box 414 a location relative to master map 420, such that the mobile device can then determine an overlapping or intersecting region between bounding box 414 and other bounding boxes.

IV. DETERMINING BOUNDING BOX INTERSECTIONS

Figure 5:
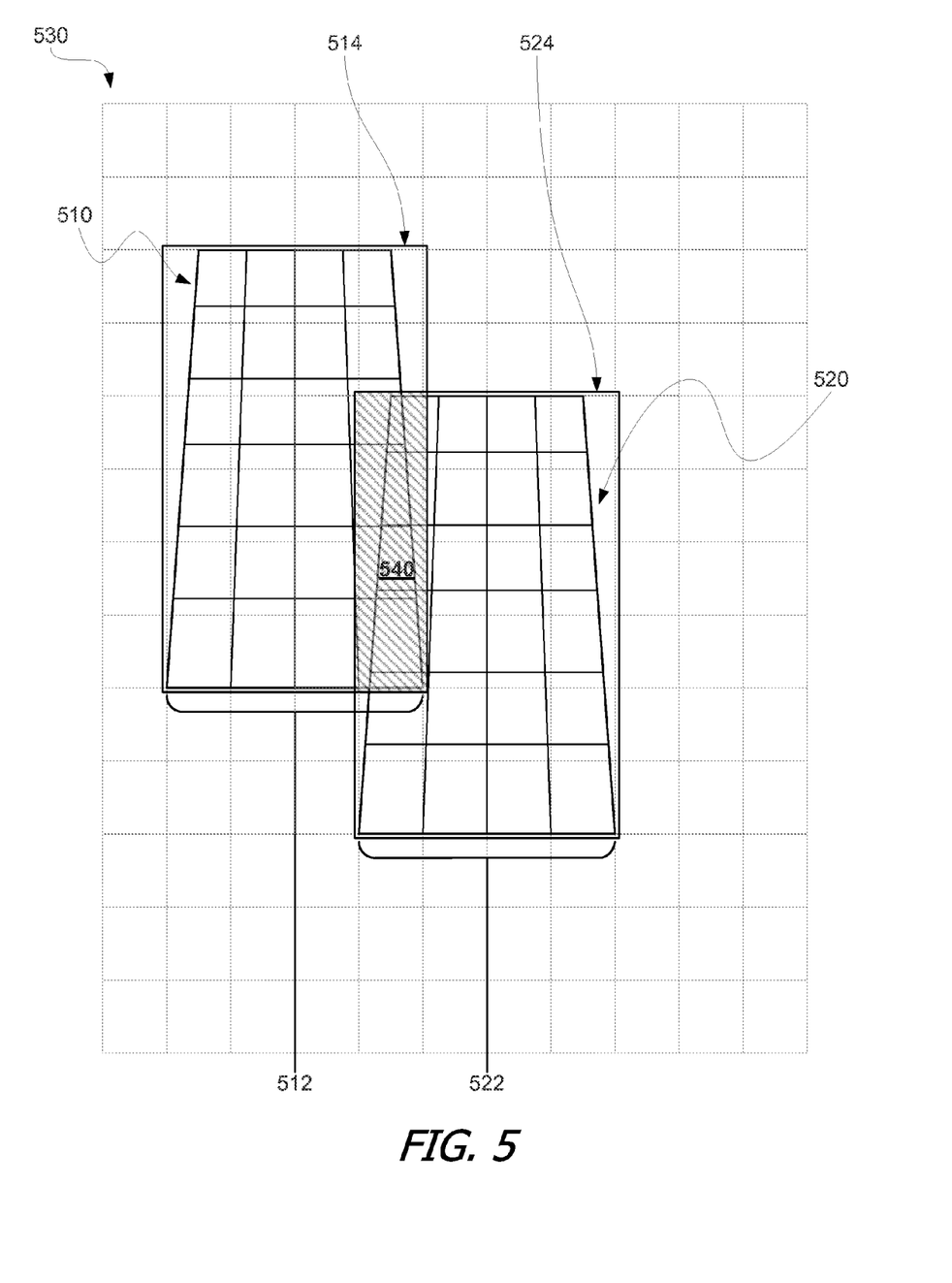
FIG. 5 is a diagram that illustrates an example of two bounding boxes that are located at their respective positions on a master map and that partially intersect each other, according to an embodiment of the invention.

In one embodiment, a mobile device can conceptually overlay, on a master map, bounding boxes of perspective map section views for both a current map section and a previously displayed map section. The mobile device can use the foregoing technique to locate each such bounding box relative to a different place on the master map. The mobile device can then determine the regions of intersection between the bounding boxes. FIG. 5 is a diagram that illustrates an example of two bounding boxes that are located at their respective positions on a master map and that partially intersect each other, according to an embodiment of the invention. A map section view 510 includes map tiles 512. Map section view 510 represents a view of a current map section that a mobile device is going to present to a user. A bounding box 514 surrounds map section view 510 as closely as possible without intersecting map section view 510. Additionally, a map section view 520 includes map tiles 522. Map section view 520 represents a view of a former map section that a mobile device previously presented to a user. A bounding box 524 surrounds map section view 520 as closely as possible without intersecting map section view 520. It may be recalled that due to the effect of three-dimensional projection onto a two-dimensional viewport, the perimeters of map section views 510 and 512 can be non-rectangular (e.g., trapezoidal).

Bounding boxes 514 and 524 are each located at their respective positions relative to a master map 530, using location techniques described above. An intersection 540 is a region that includes only the part of bounding box 514 that is also within bounding box 524, and vice-versa. Some of map tiles 512 and some of map tiles 522 may fall within intersection 540. In one embodiment of the invention, a mobile device determines which map tiles can be re-used based at least in part on which of map tiles 512 fall within intersection 540.

In one implementation, bounding boxes are expressed in whole units of master map tiles. Thus, if a master map tile is only partially overlaid by a particular one of bounding boxes 514 or 524, then the boundaries of that particular bounding box are "stretched" to the boundaries of that master map tile so that such a master map tile is completely, rather than partially, overlaid by that particular bounding box.

V. RE-USING IN-MEMORY MAP TILE DATA BASED ON AN ARRAY REPRESENTATION

In one embodiment, a mobile device stores at least two arrays in its memory. A first array, called herein the previous map section view array, contains elements pertaining to a formerly presented map section. A second array, called herein the current map section view array, contains elements pertaining to a current map section to be presented. Conceptually, each array can have a quantity of elements that is equal to the width of a corresponding bounding box (e.g., bounding boxes 514 and 524) multiplied by the height of that corresponding bounding box, measured in map tiles that the corresponding bounding box overlays on the master map (e.g., master map 530). However, each array can be stored in the mobile device's memory as a one-dimensional array.

Figure 6A:
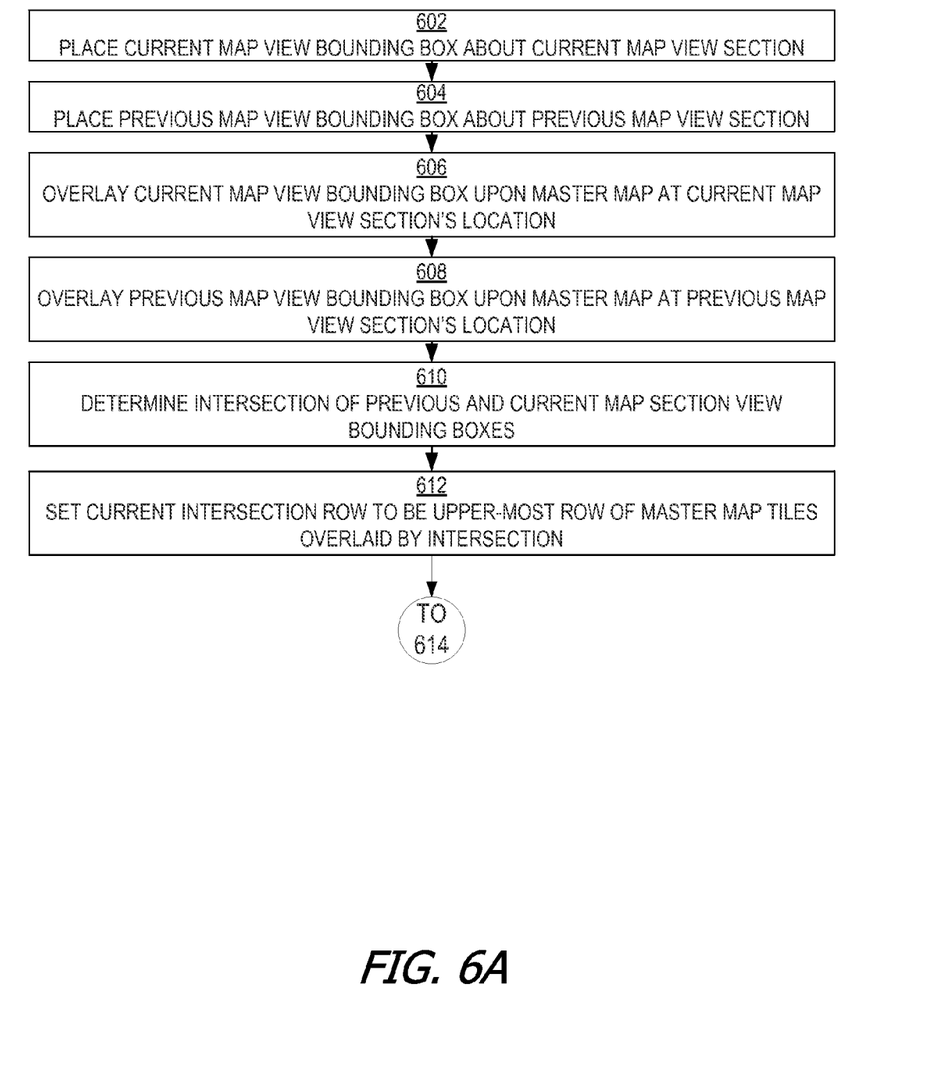
FIGS. 6A-6B show a flow diagram representing an example of a technique for re-using certain map tiles based on an intersection between bounding boxes surrounding previous and current map section views, according to an embodiment of the invention.
Figure 6B:
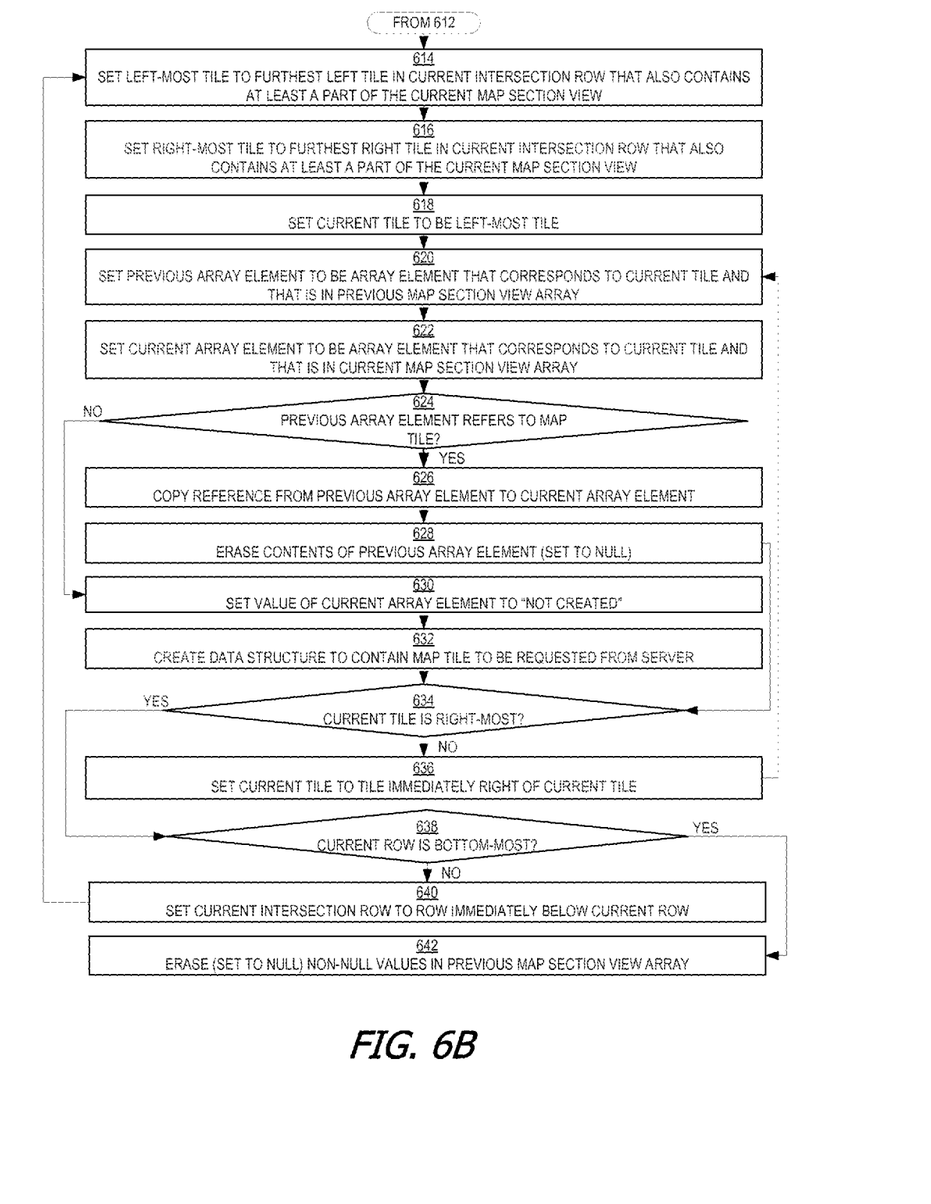

FIGS. 6A-6B show a flow diagram representing an example of a technique for re-using certain map tiles based on an intersection between bounding boxes surrounding previous and current map section views, according to an embodiment of the invention. Referring first to FIG. 6A, in block 602, a mobile device places a current map section view bounding box (e.g., box 524) about a current map section view (e.g., view 520). In block 604, the mobile device places a previous map section view bounding box (e.g., box 514) about a previous map section view (e.g., view 510). In block 606, the mobile device overlays the current map section view's bounding box upon the master map at the current map section view's location. In block 608, the mobile device overlays the previous map section view's bounding box upon the master map at the previous map section view's location.

In block 610, the mobile device determines the intersection (e.g., intersection 540) of the previous and current map section views' bounding boxes. In block 612, the mobile device sets a current intersection row to be the upper-most row of master map tiles overlaid by the intersection. The current intersection row excludes all master map tiles that are not overlaid by the intersection at least partially, even if those master map tiles are in the same row of the master map. Control passes to block 614 of FIG. 6B.

Referring next to FIG. 6B, in block 614, the mobile device sets a left-most tile to be the furthest left tile from the current intersection row that also contains (due to the overlay of the current map section view upon a portion of the master map) at least a part of the current map section view (e.g., view 520). Potentially, some tiles in the current intersection row might exist even farther to the left without containing any part of the current map section view. In block 616, the mobile device sets a right-most tile to be the furthest right tile from the current intersection row that also contains (due to the overlay of the current map section view upon a portion of the master map) at least a part of the current map section view (e.g., view 520). Potentially, some tiles in the current intersection row might exist even farther to the right without containing any part of the current map section view.

In block 618, the mobile device sets a current tile to be the left-most tile set in block 614. Array elements in both the previous and current map section view arrays will correspond to this current tile.

In block 620, the mobile device sets a previous array element to be an array element that corresponds to the current tile and that is in the previous map section view array. In block 622, the mobile device sets a current array element to be an array element that corresponds to the current tile and that is in the current map section view array. The indices of the previous and current array elements within their respective arrays may differ. The mobile device can determine these indices mathematically.

An example of one possible mathematical determination of the indices follows. The top row index, bottom row index, left column index, and right column index for each of the previous and current map section view bounding boxes, expressed in whole master map tile units, relative to the master map, is known. The quantity of tiles per row in the previous map section view bounding box is equal to that bounding box's right column index minus that bounding box's left column index. Similarly, the quantity of tiles per row in the current map section view bounding box is equal to that bounding box's right column index minus that bounding box's left column index.

Given the foregoing, for each particular master map tile overlaid by the current map section view bounding box, the index of the array element in the current map section view array that corresponds to that particular master map tile is:

(masterTileY−currentBoxTopRow)*tilesPerCurrent-
BoxRow+(masterTileX−currentBoxLeftColumn), where "masterTileY" is the row of the master map in which the particular master map tile is located, "masterTileX" is the column of the master map in which the particular master map tile is located, "currentBoxTopRow" is the row of the master map overlaid by the top of the current map section view bounding box, "currentBoxLeftColumn" is the left-most column of the master map overlaid by the current map section view bounding box, and "tilesPerCurrentBoxRow" is the quantity of tiles per row in the current map section view bounding box.

Furthermore, for each particular master map tile overlaid by the previous map section view bounding box, the index of the array element in the previous map section view array that corresponds to that particular master map tile is:

(masterTileY−previousBoxTopRow)*tilesPerPrevious-
BoxRow+(masterTileX−previousBoxLeftColumn), where "masterTileY" is (again) the row of the master map in which the particular master map tile is located, "masterTileX" is (again) the column of the master map in which the particular master map tile is located, "previousBoxTopRow" is the row of the master map overlaid by the top of the previous map section view bounding box, "previousBoxLeftColumn" is the left-most column of the master map overlaid by the previous map section view bounding box, and "tilesPerPreviousBoxRow" is the quantity of tiles per row in the previous map section view bounding box. Thus, for any particular master map tile overlaid by either the current or previous map section view bounding boxes, the mobile device can calculate the indices of array elements corresponding to that particular master map tile in each of the current and previous map section view arrays.

In block 624, the mobile device determines whether the previous array element set in block 620 refers to a map tile that is already stored in the mobile device's memory. In one implementation, the mobile device determines this to be the case if that array element contains a reference to some memory location, rather than NULL or the special value discussed below. If so, then control passes to block 626. Otherwise, control passes to block 630.

In block 626, the mobile device copies the map tile reference from the previous array element set in block 620 to the current array element set in block 622. In block 628, the mobile device erases the contents of the previous array element set in block 620. For example, the mobile device can set the value contained in the previous array element to NULL. The map tile to which the previous array element formerly referred, and to which the current array element now refers, remains in the mobile device's memory and does not need to be re-requested from any remote server. Control passes to block 634.

Alternatively, in block 630, the mobile device sets the value of the current array element (set in block 622) to a special "NOT CREATED" value that indicates that the map tile to which those array elements refer is not presently stored in the mobile device's memory. Under such circumstances, the mobile device can later request that map tile over one or more networks from a remote map server. In block 632, the mobile device creates (or allocates), in its memory, a data structure that can contain the data for the map tile yet to be requested from a remote map server. Control passes to block 634.

In block 634, the mobile device determines whether the current tile is the right-most tile set in block 616. If so, then control passes to block 638. Otherwise, control passes to block 636.

In block 636, the mobile device sets the current tile to be the tile immediately to the right of the current tile in the current intersection row. Control passes back to block 620.

Alternatively, in block 638, the mobile device determines whether the current intersection row is the bottom-most row of master map tiles overlaid by the intersection. If so, then control passes to block 642. Otherwise, control passes to block 640.

In block 640, the mobile device sets the current intersection row to be the row of master map tiles overlaid by the intersection immediately below the current intersection row.

Again, the current intersection row excludes all master map tiles that are not overlaid by the intersection at least partially, even if those master map tiles are in the same row of the master map. Control passes back to block 614.

Alternatively, in block 642, for each array element of the previous map section view array that still contains a non-NULL value, the mobile device erases that value from that array element. The mobile device additionally can free memory that was storing map tile data to which such array elements still (due not being erased in block 628) referred. For example, the mobile device can erase a value from such an array element by setting the value of that array element to NULL after freeing a block of memory to which that array element referred. Such a block of memory might have stored map tile data that is no longer needed. With the previous map section view array then cleaned in this manner, the technique illustrated in FIG. 6 concludes.

In one implementation, following the performance of the technique of FIG. 6, for each master map tile that is at least partially overlaid by the current map section view but not within the intersection, the mobile device can determine the element of the current map section view that corresponds to that master map tile. The mobile device can then set the value of that array element to the special "NOT CREATED" value, indicating that map tile data corresponding to that array element is not presently stored in the mobile device's memory.

In one implementation, the mobile device can request, from a remote map server, map tile data for each map tile that corresponds to an array element containing the special "NOT CREATED" value in the current map section view array. The mobile device can receive such map tile data from the remote map server over one or more networks. The mobile device can store such received map tile data within corresponding data structures previously created in the mobile device's memory in block 632.

In one implementation, following the population of the current map section view array with references to such newly received map tile data, the mobile device can render and display the current map section view based on the map tile data to which the elements of the current map section view array refer in the mobile device's memory.

In one implementation, following the rendering and display of the current map section view, the mobile device can swap the identities of the previous and current map section view arrays, such that the previous map section view array becomes the current map section view array, and vice-versa. Thus, the mobile device is prepared to perform the technique of FIG. 6 relative to yet another portion of the master map that the mobile device's user would like to view next.

VI. HARDWARE OVERVIEW

Figure 7A:
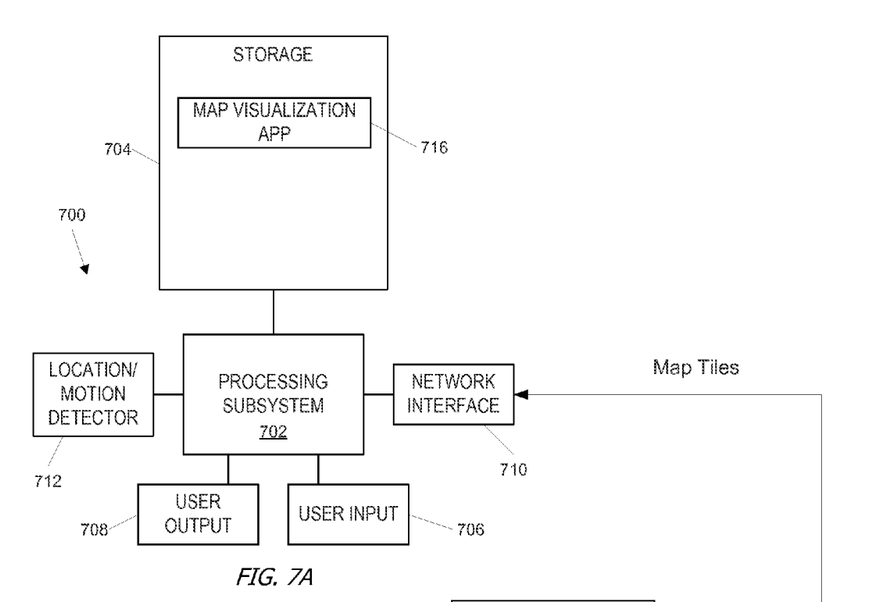
FIG. 7A is a simplified block diagram of an implementation of a device according to an embodiment of the present invention.

FIG. 7A is a simplified block diagram of an implementation of a device 700 according to an embodiment of the present invention. Device 700 can be a mobile device, a handheld device, a notebook computer, a desktop computer, or any suitable electronic device with a screen for displaying images and that is capable of communicating with a map server 750 as described herein. Device 700 includes a processing subsystem 702, a storage subsystem 704, a user input device 706, a user output device 708, a network interface 710, and a location/motion detector 712.

Processing subsystem 702, which can be implemented as one or more integrated circuits (e.g., e.g., one or more single-core or multi-core microprocessors or microcontrollers), can control the operation of device 700. In various embodiments, processing subsystem 702 can execute a variety of programs in response to program code and can maintain multiple concurrently executing programs or processes. At any given time, some or all of the program code to be executed can be resident in processing subsystem 702 and/or in storage subsystem 704.

Through suitable programming, processing subsystem 702 can provide various functionality for device 700. For example, processing subsystem 702 can execute a map visualization application program (or "app") 716. Map visualization app 716 can identify one or more regions in a potential viewing area of a map. Map visualization app 716 can perform various embodiments described herein.

Storage subsystem 704 can be implemented, e.g., using disk, flash memory, or any other storage media in any combination, and can include volatile and/or non-volatile storage as desired. In some embodiments, storage subsystem 704 can store one or more application programs to be executed by processing subsystem 702 (e.g., map visualization app 716). In some embodiments, storage subsystem 704 can store other data (e.g., used by and/or defined by map visualization app 716), such as an index of a 2D surface that defines locations of the map tiles. Programs and/or data can be stored in non-volatile storage and copied in whole or in part to volatile working memory during program execution.

A user interface can be provided by one or more user input devices 706 and one or more user output devices 708. User input devices 706 can include a touch pad, touch screen, scroll wheel, click wheel, dial, button, switch, keypad, microphone, or the like. User output devices 708 can include a video screen, indicator lights, speakers, headphone jacks, or the like, together with supporting electronics (e.g., digital-to-analog or analog-to-digital converters, signal processors, or the like). A customer can operate input devices 706 to invoke the functionality of device 700 and can view and/or hear output from device 700 via output devices 708.

Network interface 710 can provide voice and/or data communication capability for device 700. For example, network interface 710 can provide device 700 with the capability of communicating with map server 750. In some embodiments network interface 710 can include radio frequency (RF) transceiver components for accessing wireless voice and/or data networks (e.g., using cellular telephone technology, advanced data network technology such as 7G, 4G or EDGE, WiFi (IEEE 702.11 family standards, or other mobile communication technologies, or any combination thereof), and/or other components. In some embodiments network interface 710 can provide wired network connectivity (e.g., Ethernet) in addition to or instead of a wireless interface. Network interface 710 can be implemented using a combination of hardware (e.g., antennas, modulators/demodulators, encoders/decoders, and other analog and/or digital signal processing circuits) and software components.

Location/motion detector 712 can detect a past, current or future location of device 700 and/or a past, current or future motion of device 700. For example, location/motion detector 712 can detect a velocity or acceleration of mobile electronic device 700. Location/motion detector 712 can comprise a Global Positioning Satellite (GPS) receiver and/or an accelerometer. In some instances, processing subsystem 702 determines a motion characteristic of device 700 (e.g., velocity) based on data collected by location/motion detector 712. For example, a velocity can be estimated by determining a distance between two detected locations and dividing the distance by a time difference between the detections.

Figure 7B:
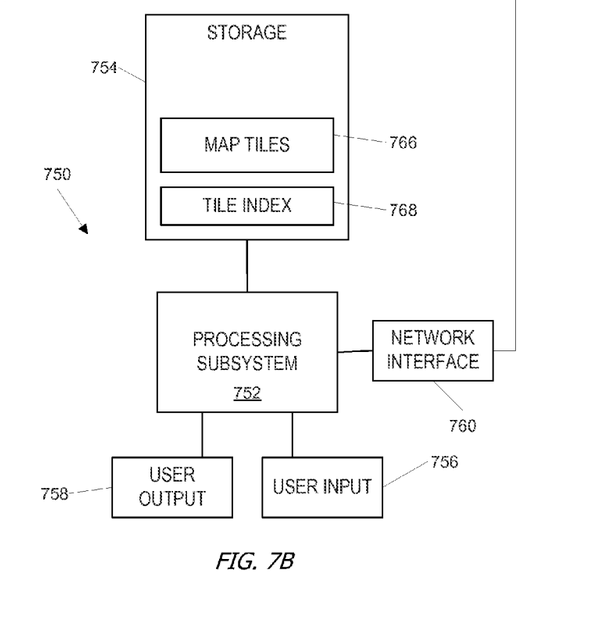
FIG. 7B is a simplified block diagram of an implementation of a map server according to an embodiment of the present invention.

FIG. 7B is a simplified block diagram of an implementation of map server 750 according to an embodiment of the present invention. Map server 750 may be used for any map server mentioned herein. Map server 750 includes a processing subsystem 752, storage subsystem 754, a user input device 756, a user output device 758, and a network interface 760. Network interface 760 can have similar or identical features as network interface 710 of device 700 described above.

Processing subsystem 752, which can be implemented as one or more integrated circuits (e.g., a conventional microprocessor or microcontroller), can control the operation of map server 750. In various embodiments, processing subsystem 752 can execute a variety of programs in response to program code and can maintain multiple concurrently executing programs or processes. At any given time, some or all of the program code to be executed can be resident in processing subsystem 752 and/or in storage subsystem 754.

Through suitable programming, processing subsystem 752 can provide various functionality for map server 750. Thus, map server 750 can interact with map visualization app 716 being executed on device 700 in order to provide map tiles to device 700. In one embodiment, map server 750 simply stores the map tiles 766, and sends them based on a request for a particular index, as identified by tile index 768. The map tiles can be stored in a location pointed to by the tile index 768 for quick retrieval.

Storage subsystem 754 can be implemented, e.g., using disk, flash memory, or any other storage media in any combination, and can include volatile and/or non-volatile storage as desired. In some embodiments, storage subsystem 754 can store one or more application programs to be executed by processing subsystem 752. In some embodiments, storage subsystem 754 can store other data, such as map tiles 766 and tile index 768 (used to identify specific tiles). Programs and/or data can be stored in non-volatile storage and copied in whole or in part to volatile working memory during program execution.

A user interface can be provided by one or more user input devices 756 and one or more user output devices 758. User input and output devices 756 and 758 can be similar or identical to user input and output devices 706 and 708 of device 700 described above. In some instances, user input and output devices 756 and 758 are configured to allow a programmer to interact with map server 750. In some instances, map server 750 can be implemented at a server farm, and the user interface need not be local to the servers.

It will be appreciated that device 700 and map server 750 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 700 and/or multiple map servers 750, different devices 700 and/or map servers 750 can have different sets of capabilities; the various devices 700 and/or map servers 750 can be but need not be similar or identical to each other.

Further, while device 700 and map server 750 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 700 and map server 750 are described as singular entities, it is to be understood that each can include multiple coupled entities. For example, map server 750 can include, a server, a set of coupled servers, a computer and/or a set of coupled computers.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

The subsystems can be interconnected via a system bus. Additional subsystems can be a printer, keyboard, fixed disk, monitor, which can be coupled to display adapter. Peripherals and input/output (I/O) devices, which couple to an I/O controller, can be connected to the computer system by any number of means known in the art, such as serial port. For example, serial port or external interface (e.g. Ethernet, Wi-Fi, etc.) can be used to connect computer system to a wide area network such as the Internet, a mouse input device, or a scanner. The interconnection via the system bus can allow the central processor to communicate with each subsystem and to control the execution of instructions from system memory or the fixed disk, as well as the exchange of information between subsystems. The system memory and/or the fixed disk may embody a computer readable medium. Any of the values mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A computer-implemented method comprising:
    determining boundaries of a first bounding box around a first non-rectangular polygon that represents a perimeter of a projection of a three-dimensional view of a first map section;
    determining boundaries of a second bounding box around a second non-rectangular polygon that represents a perimeter of a projection of a three-dimensional view of a second map section that differs from the first map section;
    based at least in part on the boundaries of the first bounding box and the boundaries of the second bounding box, determining a first set of map tiles that are already in a device memory of a device and that can be re-used to render at least a portion of the view of the first map section without requesting the first set of map tiles from a source external to the device memory, wherein the source external to the device memory is a server;
    based at least in part on the boundaries of the first bounding box and the boundaries of the second bounding box, determining a second set of map tiles that are not already in the device memory and need to be requested from the source external to the device memory in order to render at least a portion of the view of the first map section;
    rendering the projection of the three-dimensional view of the first map section based at least in part on the determined first set of map tiles and the determined second set of map tiles; and
    displaying the rendered projection.

2. The computer-implemented method of claim 1, further comprising:
    determining an intersection between the first bounding box and the second bounding box; and
    determining the first set of map tiles based at least in part on the intersection.

3. The computer-implemented method of claim 2, further comprising:
    determining a first location of the first bounding box relative to a master map that contains the first map section and the second map section;
    determining a second location of the second bounding box relative to the master map; and
    determining the intersection based at least in part on the first location and the second location.

4. The computer-implemented method of claim 3, further comprising:
    determining the first set of map tiles to be map tiles from the master map that are both in the intersection and that contain at least a portion of the first non-rectangular polygon; and
    determining the second set of map tiles to be map tiles from the master map that are not in the intersection but that contain at least a portion of the first non-rectangular polygon.

5. The computer-implemented method of claim 4, further comprising:
    copying references to map tiles in the first set of map tiles from an array for the second map section in the device memory to an array for the first map section in the device memory;
    requesting, from the server external to the device containing the device memory, particular map tiles in the second set of map tiles;
    storing, in the device memory, the particular map tiles received at the device in response to the request to the server; and
    storing, in the array for the first map section, references to the particular map tiles stored in the device memory.

6. The computer-implemented method of claim 5, further comprising:
    determining a third set of map tiles to be map tiles from the master map that are in the first bounding box but that do not contain any portion of the first non-rectangular polygon; and
    storing, in the array for the first map section, in particular array elements that correspond to the third set of map tiles, values indicating that the particular array elements do not refer to any map tiles stored in memory.

7. The computer-implemented method of claim 5, further comprising:
    after copying the references to the map tiles in the first set of map tiles from the array for the second map section to the array for the first map section, removing the references from particular array elements from which the references were copied in the array for the second map section;

after removing the references from the particular array elements, freeing portions of the device memory that contain map tiles to which array elements in the array for the second map section still refer; and after rendering the projection of the three-dimensional view of the first map section, swapping identities of the array for the first map section and the array for the second map section.

8. A non-transitory computer-readable storage medium storing instructions which, when executed by one or more processors, cause the one or more processors to perform operations comprising:

determining boundaries of a first bounding box around a first non-rectangular polygon that represents a perimeter of a projection of a three-dimensional view of a first map section;

determining boundaries of a second bounding box around a second non-rectangular polygon that represents a perimeter of a projection of a three-dimensional view of a second map section that differs from the first map section;

based at least in part on the boundaries of the first bounding box and the boundaries of the second bounding box, determining a first set of map tiles that are already in a device memory of a device and that can be re-used to render at least a portion of the view of the first map section without requesting the first set of map tiles from a source external to the device memory, wherein the source external to the device memory is a server; and based at least in part on the boundaries of the first bounding box and the boundaries of the second bounding box, determining a second set of map tiles that are not already in the device memory and need to be requested from the source external to the device memory in order to render at least a portion of the view of the first map section.

9. The non-transitory computer-readable storage medium of claim 8, wherein the instructions, when executed by the one or more processors, cause the one or more processors to perform operations comprising:

determining an intersection between the first bounding box and the second bounding box; and determining the first set of map tiles based at least in part on the intersection.

10. The non-transitory computer-readable storage medium of claim 9, wherein the instructions, when executed by the one or more processors, cause the one or more processors to perform operations comprising:

determining a first location of the first bounding box relative to a master map that contains the first map section and the second map section;

determining a second location of the second bounding box relative to the master map; and determining the intersection based at least in part on the first location and the second location.

11. The non-transitory computer-readable storage medium of claim 10, wherein the instructions, when executed by the one or more processors, cause the one or more processors to perform operations comprising:

determining the first set of map tiles to be map tiles from the master map that are both in the intersection and that contain at least a portion of the first non-rectangular polygon; and determining the second set of map tiles to be map tiles from the master map that are not in the intersection but that contain at least a portion of the first non-rectangular polygon.

12. The non-transitory computer-readable storage medium of claim 11, wherein the instructions, when executed by the one or more processors, cause the one or more processors to perform operations comprising:

copying references to map tiles in the first set of map tiles from an array for the second map section in the device memory to an array for the first map section in the device memory;

requesting, from the server external to the device containing the device memory, particular map tiles in the second set of map tiles;

storing, in the device memory, the particular map tiles received at the device in response to the request to the server; and storing, in the array for the first map section, references to the particular map tiles stored in the device memory.

13. The non-transitory computer-readable storage medium of claim 12, wherein the instructions, when executed by the one or more processors, cause the one or more processors to perform operations comprising:

determining a third set of map tiles to be map tiles from the master map that are in the first bounding box but that do not contain any portion of the first non-rectangular polygon; and storing, in the array for the first map section, in particular array elements that correspond to the third set of map tiles, values indicating that the particular array elements do not refer to any map tiles stored in memory.

14. The non-transitory computer-readable storage medium of claim 12, wherein the instructions, when executed by the one or more processors, cause the one or more processors to perform operations comprising:

after copying the references to the map tiles in the first set of map tiles from the array for the second map section to the array for the first map section, removing the references from particular array elements from which the references were copied in the array for the second map section;

after removing the references from the particular array elements, freeing portions of the device memory that contain map tiles to which array elements in the array for the second map section still refer;

rendering the projection of the three-dimensional view of the first map section based at least in part on the determined first set of map tiles and the determined second set of map tiles;

displaying the rendered projection; and after rendering the projection of the three-dimensional view of the first map section, swapping identities of the array for the first map section and the array for the second map section.

15. A system comprising:

one or more processors; and a device memory storing instructions operable to cause the one or more processors to:

determine boundaries of a first bounding box around a first non-rectangular polygon that represents a perimeter of a projection of a three-dimensional view of a first map section;

determine boundaries of a second bounding box around a second non-rectangular polygon that represents a perimeter of a projection of a three-dimensional view of a second map section that differs from the first map section; and determine, based at least in part on the boundaries of the first bounding box and the boundaries of the second bounding box, a first set of map tiles that are already in the device memory of a device and that can be re-used to render at least a portion of the view of the first map section without requesting the first set of map tiles from a source external to the device memory, wherein the source external to the device memory is a server; and determine, based at least in part on the boundaries of the first bounding box and the boundaries of the second bounding box, a second set of map tiles that are not already in the device memory and need to be requested from the source external to the device memory in order to render at least a portion of the view of the first map section.

16. The system of claim 15, wherein the device memory stores instructions operable to cause the one or more processors to:

determine an intersection between the first bounding box and the second bounding box; and determine the first set of map tiles based at least in part on the intersection.

17. The system of claim 16, wherein the device memory stores instructions operable to cause the one or more processors to:

determine a first location of the first bounding box relative to a master map that contains the first map section and the second map section;

determine a second location of the second bounding box relative to the master map; and determine the intersection based at least in part on the first location and the second location.

18. The system of claim 17, wherein the device memory stores instructions operable to cause the one or more processors to:

determine the first set of map tiles to be map tiles from the master map that are both in the intersection and that contain at least a portion of the first non-rectangular polygon; and determine the second set of map tiles to be map tiles from the master map that are not in the intersection but that contain at least a portion of the first non-rectangular polygon.

19. The system of claim 18, wherein the device memory stores instructions operable to cause the one or more processors to:

copy references to map tiles in the first set of map tiles from an array for the second map section in the device memory to an array for the first map section in the device memory;

request, from the server external to the device containing the device memory, particular map tiles in the second set of map tiles;

store, in the device memory, the particular map tiles received at the device in response to the request to the server; and store, in the array for the first map section, references to the particular map tiles stored in the device memory.

20. The system of claim 19, wherein the device memory stores instructions operable to cause the one or more processors to:

determine a third set of map tiles to be map tiles from the master map that are in the first bounding box but that do not contain any portion of the first non-rectangular polygon;

store, in the array for the first map section, in particular array elements that correspond to the third set of map tiles, values indicating that the particular array elements do not refer to any map tiles stored in memory;

remove the references from particular array elements from which the references were copied in the array for the second map section after copying the references to the map tiles in the first set of map tiles from the array for the second map section to the array for the first map section;

free portions of the device memory that contain map tiles to which array elements in the array for the second map section still refer after removing the references from the particular array elements;

render the projection of the three-dimensional view of the first map section based at least in part on the determined first set of map tiles and the determined second set of map tiles;

display the rendered projection; and swap identities of the array for the first map section and the array for the second map section after rendering the projection of the three-dimensional view of the first map section.

21. The computer-implemented method according to claim 4, wherein each tile of the first set of map tiles from the master map and each tile of the second set of map tiles from the master map has a unique identifier.

* * * * *